April 12, 1966  R. O. PATT  3,245,303
DEVICE AND METHOD OF TEACHING FINGER POSITIONS
FOR FRETTED STRING INSTRUMENTS
Filed June 15, 1962  2 Sheets-Sheet 1
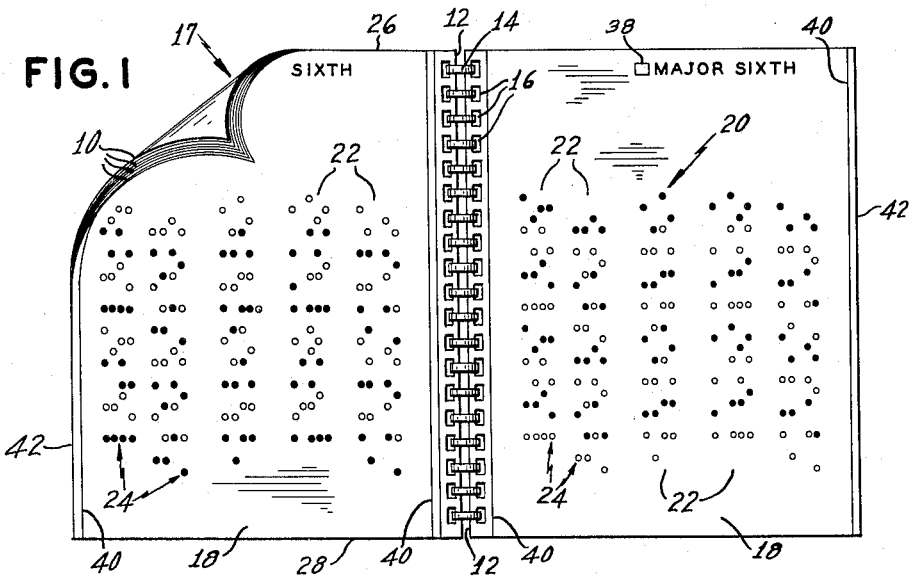
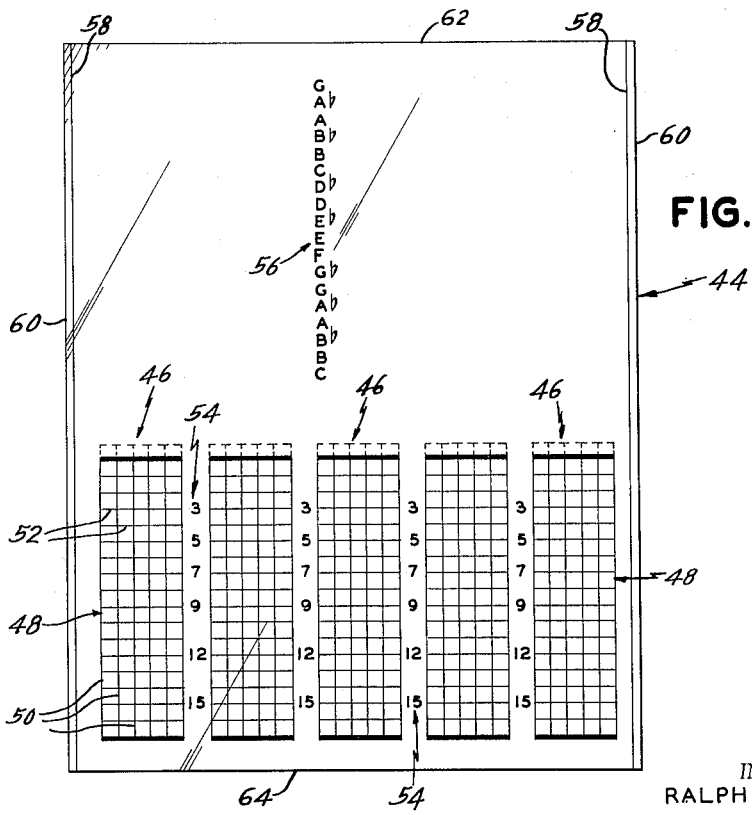
INVENTOR.
RALPH O. PATT
BY Stanley I. Rosen
ATTORNEY April 12, 1966 R. O. PATT 3,245,303
DEVICE AND METHOD OF TEACHING FINGER POSITIONS
FOR FRETTED STRING INSTRUMENTS
Filed June 15, 1962 2 Sheets-Sheet 2

INVENTOR.
RALPH O. PATT
BY
*Stanley I. Rosen*
ATTORNEY

United States Patent Office 3,245,303
Patented Apr. 12, 1966

3,245,303
DEVICE AND METHOD OF TEACHING FINGER POSITIONS FOR FRETTED STRING INSTRUMENTS
Ralph O. Patt, Brentwood, N.Y., assignor to Henry Adler, Inc., New York, N.Y., a corporation of New York
Filed June 15, 1962, Ser. No. 202,918
3 Claims. (Cl. 84—485)

This invention relates to a device and method of teaching finger positions for fretted string instruments.

Learning to play a fretted string instrument, for example the guitar, is for most people, a difficult task because of the numerous different finger positions required for playing the different chord types. For example, to play the different variations of 20 chord types on the guitar, 9600 different finger positions are required. This is readily apparent since there are 12 chromatic variations for each chord type and for each chromatic variation there are 10 voicings and 4 inversions of each voicing.

The primary object of the present invention is to provide an extremely simple and convenient method and device for teaching the various finger positions for playing chord types on a fretted string instrument.

The above and other objects, features and advantages of the above invention will be more fully understood from the following description of the invention considered in connection with the accompanying illustrative drawings.

In the drawings:

FIG. 1 is a top plan view of part of a device according to the present invention;

FIG. 2 is a top plan view of another part of the device which is used in conjunction with the part illustrated in FIG. 1;

Figure 3:
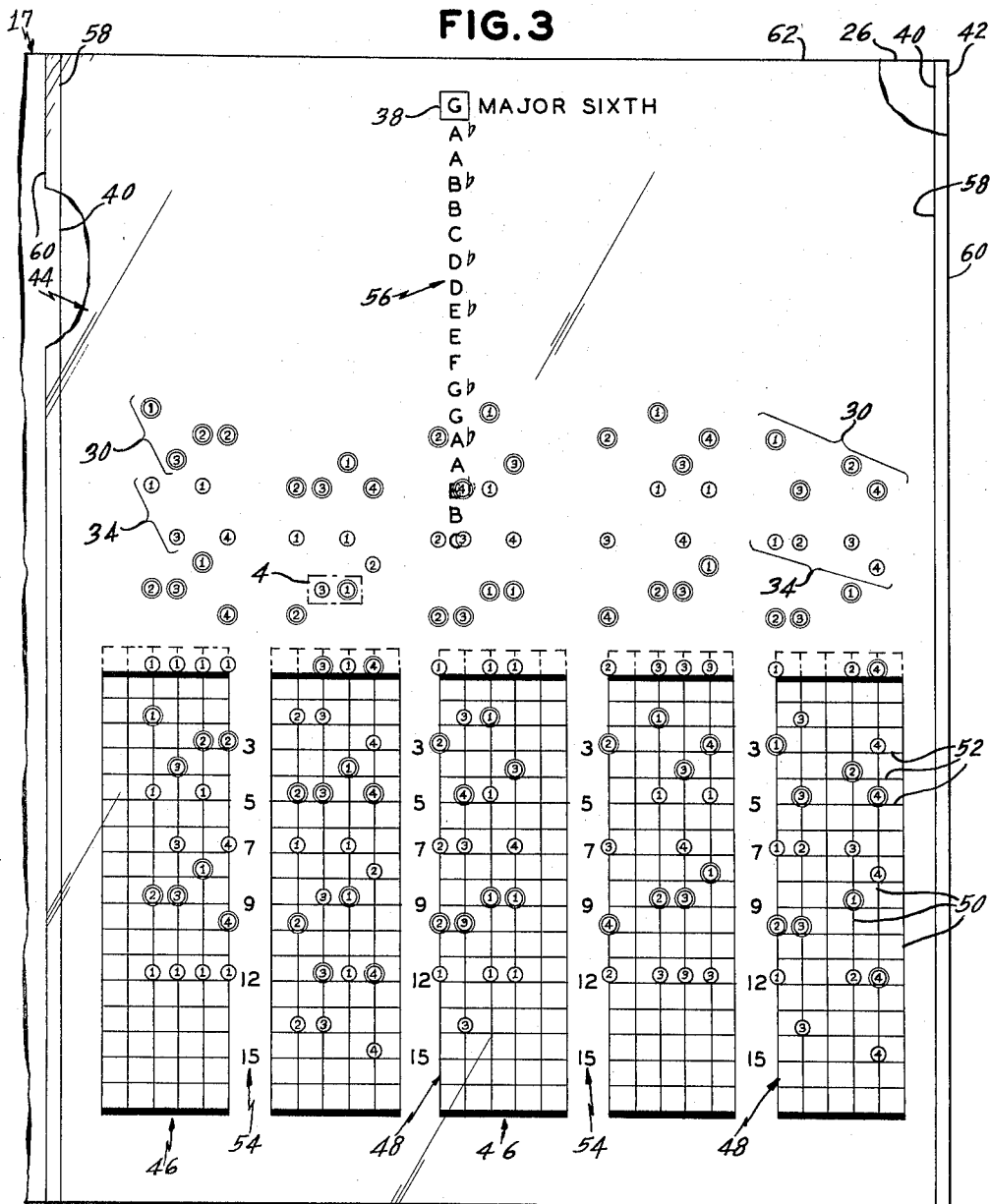
FIG. 3 is a top plan view showing the parts of FIG. 1 and 2 in operative relation.

Referring now to the drawings in detail, the finger position teaching device comprises a series of sheet members or pages 10 which are bound together along their adjacent inner vertical side edges 12 by a spiral ring 14 which extends through perforations 16 provided along said edges of the pages to conveniently arrange the pages in the form of a booklet 17. As herein shown, adjacent surfaces of adjacent pages are provided with indicia 20 representing finger positions for a chord type as, for example, the major sixth chord type. It is to be observed that with respect to the guitar, 40 pages are provided to illustrate the correct finger positions for the twenty major chord types.

The finger positions indicia 20 comprises a series of vertically extending and laterally spaced columns 22 of finger position indicators 24. Each column of finger position indicators represents the finger positions for one voicing for the companion chord type, and since there are 10 voicings for each chord type, there are ten columns provided, five on one page and five on the adjacent page.

Figure 4:
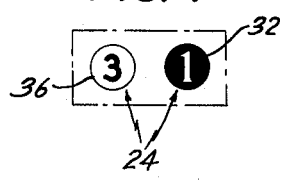
FIG. 4 is a detail view, on a larger scale, of a portion of the part illustrated in FIG. 3.

The finger position indicators 24 comprise a plurality of encircled numbers which are arranged in laterally spaced vertical rows and in groups which are vertically separated from each other in a direction extending between the top edge 26 and the bottom edge 28 of the companion page 10. The different groups represent different inversions of the voicings. As best seen in FIGS. 3 and 4, adjacent groups of encircled numbers are distinguished from one another by providing alternate groups 30 of numbers as white numbers on a black background 32 and by providing intervening groups 34 of numbers as black numbers on a white encircled background 36, although it will be understood that any suitable arrangement for distinguishing one group of numbers from another can be provided, as by the use of different colors, for example. It is to be noted that the numbers vary from 1 to 4 and indicate the number of the finger of the hand which is to be used for playing the particular version of the chord type. It will be understood that the arrangement of the indicators 24 on the sheet is determined by the known positions of the fingers for playing the particular chord type.

In addition to the finger position indicators 24, the surface 18 of the page 10 is provided with a block 38 positioned in the center of the page near the upper edge 26 thereof. Alongside the block, the chord type to which the page refers is indicated. As will be more clearly understood hereinafter, the block functions as a locating or positioning means for determining the different finger positions for the different chromatic versions of the particular chord type.

A pair of laterally spaced vertical lines 40 are provided on the surface 18 of the page and extend along the inner side edge 12 and outer side edge 42 of the page. As will be more clearly understood hereinafter, these lines function as aligning means.

A transparent sheet member 44 or overlay (FIGS. 2 and 3) is provided and is adapted to be superimposed on the surface 18 of the page 10 so that the finger positions indicia 20 are visible through the overlay. The lower part of the overlay is provided with a series of vertically extending laterally spaced columns 46 of grid lines 48 and it is to be noted that five columns are provided. The spacing between the columns corresponds to the spacing between columns 22 of the finger position indicators 24. Each column of grid lines comprises six laterally spaced vertical lines 50 which represent the strings of the instrument, and a series of horizontal vertically spaced lines 52 which represent the frets of the fret board of the instrument. In order to more easily identify the various fret lines, identifying numbers 54 are provided along one side of each column.

The upper portion of the overlay 44 is provided with a vertical column 56 of the different notes of the chromatic scale. A pair of laterally spaced vertical lines 58 extends along the side edges 60 of the overlay between its top edge 62 and its bottom edge 64. The spacing between lines 58 is the same as the spacing between lines 40 and the column 56 of notes is positioned with reference to lines 58 so that when the overlay is placed on top of sheet 10, with lines 58 in registry with lines 40, the column of notes is in registry with box 38 to indicate the chromatic version of the chord type whose proper finger positions are indicated through the transparent overlay.

As just indicated and as illustrated by FIG. 3, in the use of the apparatus, the overlay is placed in position overlying the surface 18 of the page and the overlay is positioned properly with respect to the underlying page by aligning lines 58 with the companion underlying lines 40. The overlay is then moved vertically so that one of the chromatic versions of the chord type is positioned within box 38 as, for example, the G Major Sixth chord type illustrated in FIG. 3. In this position of the overlay and the underlying page, the finger positions for five voicings of the G Major Sixth chord type are displayed as well as the four inversions of each voicing. More particularly, and as illustrated by the visible column 22 of finger position indicators 24, adjacent edge 12 of the page 10 and the superposed registered column 56 of grid lines 48, the finger positions for the different inversions of that voicing of the G Major Sixth type chord type and are displayed as follows:

First inversion

The first finger is placed on the fourth string at the second fret, the third finger is placed on the third string at the fourth fret, and the second finger lays flat or "bridges" the first and second strings at the third fret.

Second inversion

The next group of numbers shows how to place the fingers to play the second inversion of the G Major Sixth chord type. The first finger is placed on the second and fourth string at the fifth fret, the third finger is placed on the third string at the seventh fret, and the fourth finger is placed on the first string at the seventh fret.

Third inversion

The first finger is placed on the second string at the eighth fret, the second finger is placed on the fourth string at the ninth fret, the third finger is placed on the third string at the ninth fret, and the fourth finger is placed on the first string at the tenth fret.

Fourth inversion

The first finger bridges the first, second, third and fourth strings at the twelfth fret.

In order to determine the finger positions for another chromatic version of the Major Sixth chord type, the overlay 44 is moved vertically so that another note of the chromatic scale is positioned in box 38 and in said position the grid lines of the overlay register with the underlying numbers of the underlying page to indicate the finger positions for that chromatic version of the chord type. It is to be observed that positioning of the overlay on the underlying page displays the proper finger positions for the four inversions of five voicings of the particular chromatic version of the particular chord type. To determine the other finger positions for the remaining five voicings and their corresponding inversions, the overlay is shifted to the adjacent page and used in the exact same manner as just described. The other pages of the booklet are used to determine the finger positions for the other chord types.

While I have shown and described the preferred embodiment of my invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. A device for teaching finger positions for playing chord types on a fretted string instrument, said device comprising:
   (a) a sheet member having a surface provided with indicia thereon representing finger positions for a chord type,
   (b) said indicia comprising a series of laterally spaced columns of finger position indicators, each of said columns representing a different voicing for said chord type,
   (c) each of said columns having its finger position indicators arranged in laterally spaced groups corresponding to the different inversions of the voicing, and
   (d) a transparent sheet member for overlying said surface so that said finger position indicia are visible through said transparent sheet member,
   (e) said transparent sheet member having a series of laterally spaced grid lines corresponding in number to said finger position groups and each representing the fret board of the instrument, so that in the operative overlying position of said sheet member said series of grid lines overlie and register with the companion underlying series of finger position groups to indicate the finger positions for the different voices for said chord type,
   (f) said transparent sheet member having a series of laterally spaced notes delineated thereon corresponding to the notes of the chromatic scale,
   (g) said transparent sheet member and said underlying sheet member being movable relative to each other so that said grid lines can be positioned over corresponding parts of said indicia to indicate the finger positions for the chromatic variation of said chord type,
   (h) said underlying sheet member having positioning means for said notes on said transparent sheet member so that the latter can be correctly positioned with respect to said underlying sheet member according to the chromatic variations of said chord type.

2. A device for teaching finger positions for playing chord types on a fretted string instrument as set forth in claim 1 and further including, aligning means on said transparent sheet member and companion aligning means on said underlying sheet member for aligning said sheet members relative to each other so that said grid lines are properly positioned relative to said underlying finger position indicia.

3. A device for teaching finger positions for playing chord types on a fretted string instrument as set forth in claim 2 wherein, said aligning means on each of said transparent sheet member and underlying sheet member comprise pairs of laterally spaced parallel lines of equal spacing so that said lines on said members are in registry with each other when said members are positioned properly.

References Cited by the Examiner

UNITED STATES PATENTS

| | | | |
|---|---|---|---|
| 614,775 | 11/1898 | St. John | 84—483 |
| 1,053,366 | 2/1913 | Dickson | 283—47 |
| 1,300,193 | 4/1919 | Raff | 84—485 |
| 1,436,771 | 11/1922 | Meling | 84—473 |
| 1,509,320 | 9/1924 | Schneider | 84—485 |
| 1,868,823 | 7/1932 | Goodrich | 35—9 |
| 2,001,191 | 5/1935 | Golden | 84—485 |
| 2,063,501 | 12/1936 | Harbo | 84—471 |
| 2,225,613 | 12/1940 | Alyn | 84—314 |
| 2,327,907 | 8/1943 | Knox | 84—472 |
| 2,516,485 | 7/1950 | Rogers | 84—477 |
| 2,564,616 | 8/1951 | Telasco | 84—473 |
| 2,718,169 | 9/1955 | Barnes | 84—480 |

FOREIGN PATENTS

| | | |
|---|---|---|
| 9,641 | 5/1900 | Great Britain. |
| 362,589 | 6/1962 | Switzerland. |

OTHER REFERENCES

"Slide-A-Chord" leaflet, Slide-A-Chord Company, Brooklyn 8, N.Y.; February 8, 1962 (copy in Group 430.)

LEO SMILOW, *Primary Examiner.*

C. M. OVERBEY, *Assistant Examiner.*